April 17, 1928.
J. D. NEULS
1,666,178
DISPENSING APPARATUS
Filed June 25, 1925
2 Sheets-Sheet 1
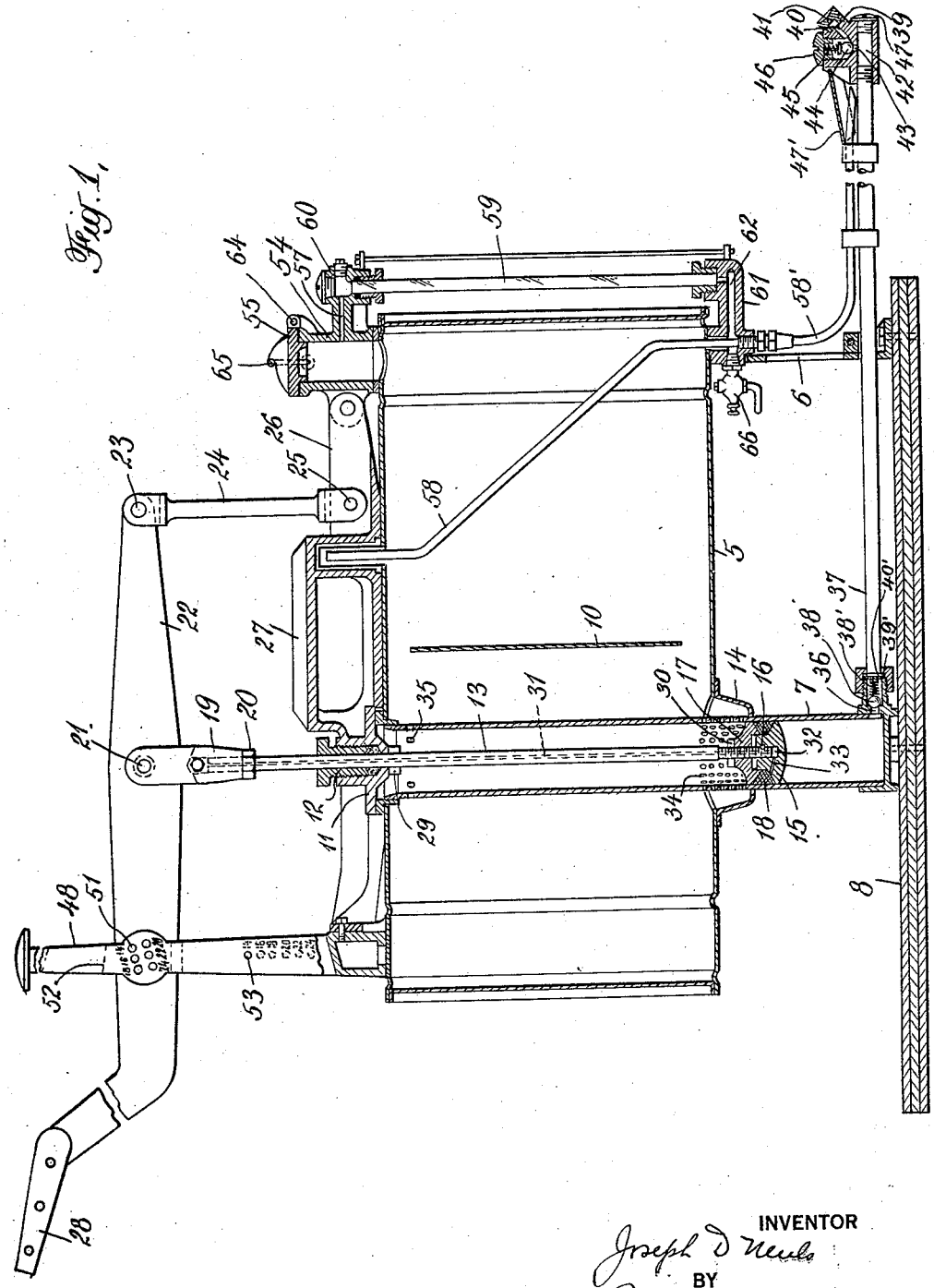
INVENTOR
Joseph D Neuls
BY
Pennie Davis Marvin & Edmonds
his ATTORNEYS April 17, 1928.
J. D. NEULS
DISPENSING APPARATUS
Filed June 25, 1925
1,666,178
2 Sheets-Sheet 2
Fig. 2,
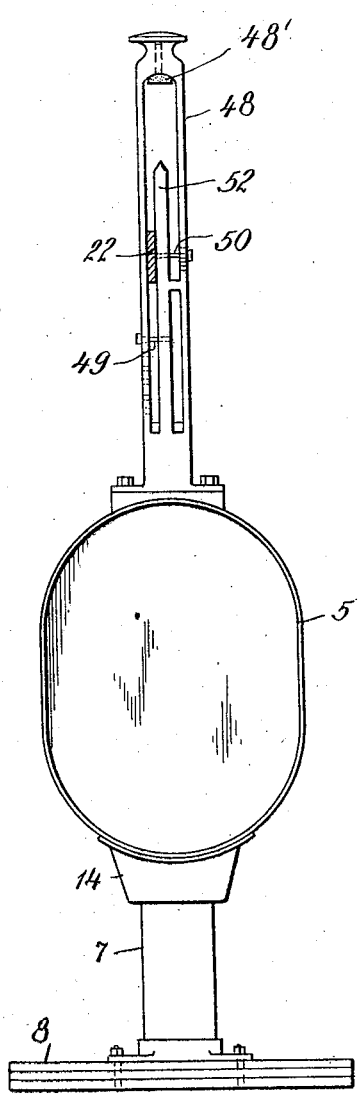
Fig. 3,
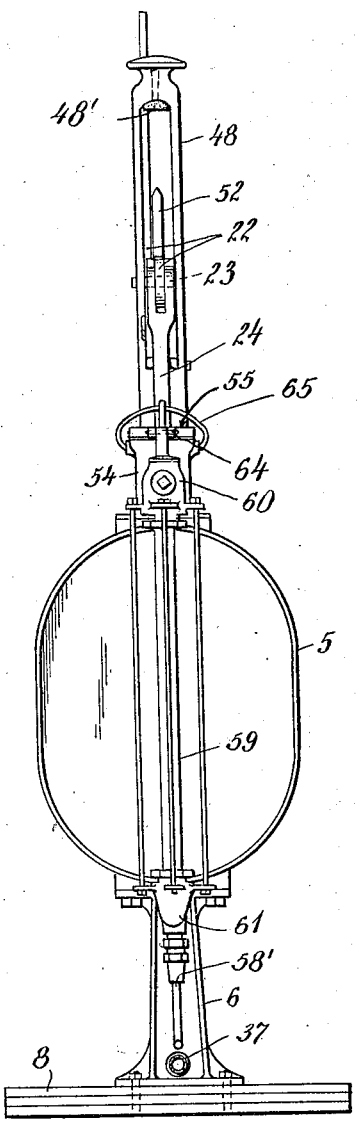
INVENTOR
Joseph D. Neuls
BY
Pennie Davis Marvin & Edmonds
his ATTORNEYS Patented Apr. 17, 1928.

1,666,178

UNITED STATES PATENT OFFICE.

JOSEPH D. NEULS, OF LOS ANGELES, CALIFORNIA, ASSIGNOR TO CALIFORNIA CYANIDE COMPANY, INC., OF NEW YORK, N. Y., A CORPORATION OF DELAWARE.

DISPENSING APPARATUS.

Application filed June 25, 1925. Serial No. 39,588.

This invention relates to fumigation, and particularly to apparatus for delivering measured doses of poisonous and other liquids in the form of a fine spray. The apparatus is designed particularly to facilitate the use of liquids such as hydrocyanic acid which, having a boiling point close to ordinary atmospheric temperatures, is vaporized readily when sprayed in to the atmosphere. The invention can be used, however, in handling other liquids of a dangerous nature or even such as do not require the practice of such precaution as is necessary in the case of hydrocyanic acid.

In citrus orchards, particularly in California, hydrocyanic acid is used to destroy scale. Originally the hydrocyanic acid was released by the action of a mineral acid, for example, sulfuric acid upon a cyanide such as sodium cyanide. The materials were combined within a tent or enclosure surrounding the tree and the released hydrocyanic acid was permitted to diffuse through the space within the enclosure. More recently liquid hydrocyanic acid has been sprayed into the tent by suitable apparatus provided for that purpose, but the apparatus heretofore used has not been entirely satisfactory.

It is necessary in practicing fumigation with liquid hydrocyanic acid to supply measured doses of the liquid. These doses vary with the size of the tree and the amount of liquid which must be supplied for a tree of any given dimensions in order to ensure a thorough kill has been determined with great accuracy. The application of smaller doses results in failure to kill the scale. On the other hand, excessive doses injure the trees. The limits of accuracy required of the apparatus are very close. It must, nevertheless, be portable, easily operated and safe. The latter requirement is especially important owing to the dangerous character of the fumigant, and the apparatus must be so constructed that leakage or discharge of liquid except under the actuation of the measuring pump is impossible.

Another important requirement arises especially in the case of hydrocyanic acid, the boiling point of which closely approximates ordinary atmospheric temperatures. During the fumigating season in many parts of California the atmospheric temperatures rise considerably above the boiling point of hydrocyanic acid. The accurate measurement of doses of a liquid at or above its boiling point is particularly difficult, yet its accomplishment is essential to successful fumigation practice.

It is the object of the present invention to provide a fumigating apparatus which is sturdy in construction, has a relatively large capacity for liquid, is easily operated to deliver accurate doses of the liquid and from which the liquid cannot escape except in the intended manner.

Another object of the invention is the provision of a fumigating apparatus which is capable of accurately measuring doses of a volatile liquid at or above its boiling point and of delivering the measured doses in the form of a spray so that the liquid will be completely vaporized and will effectively accomplish its purpose.

Other objects and advantages of the invention will be apparent as it is better understood by reference to the following specification and accompanying drawing, in which:

Fig. 1 is a longitudinal section through the apparatus;

Fig. 2 is an end elevation of one end of the appratus; and

Fig. 3 is a similar view illustrating the opposite end of the apparatus.

The difficulty experienced with fumigating apparatus heretofore has been the result of the attempt to use valves to control the flow of the liquid hydrocyanic acid in measuring the dose of liquid which is to be ejected. Such valves, either of the suction or positively actuated type, fail especially when fumigation is attempted under conditions of relatively high atmospheric temperatures. Even when the valves are made as large as is practicable the liquid does not flow therethrough with sufficient rapidity to fill the cylinder space below the piston before the ejecting stroke commences which determines the volume of liquid in the dose to be ejected. When operating at high temperatures there is always a certain amount of vapor and this is trapped in the space above the liquid and below the piston and prevents the required amount from flowing into the cylinder. This result is avoided in the present apparatus by the application of an entirely different principle, that is, measurement by displacement. Instead of drawing into the pump cylinder the required amount of liquid, the cylinder always contains a surplus of liquid and the required dose is ejected by displacement of the piston through a definite space which is exactly equal to the volume of the required dose of the liquid to be ejected. Thus in the operation of the apparatus upon the upward stroke of the piston all of the space in the cylinder beneath the inlet ports for the liquid is filled with liquid and any vapor in that space is quickly displaced by the heavier liquid. The downward stroke of the piston is limited to give the required displacement and the amount of downward movement may be regulated so that different doses can be ejected. The amount of liquid displaced is always exactly equal to the space through which the piston has moved in traveling from the lowest inlet to the end of the stroke, and consequently the dose can be determined with great accuracy. Any liquid remaining in the cylinder at the end of the piston stroke is supplemented at the end of the next upward stroke by fresh liquid drawn from the source of supply and the apparatus is then ready for another measuring stroke and the discharge of the measured dose.

It is essential to the successful measurement of doses of liquid by displacement that the outlet from the pump cylinder be closed during the upward stroke of the piston. This is to avoid the introduction of air to the cylinder. A check valve is disposed consequently in the outlet so that the liquid is permitted to escape under pressure of the piston but the outlet is closed as soon as this pressure is released. When the piston rises there is no inlet for air or liquid and a partial vacuum is created. This continues until the piston passes the ports affording communication between the cylinder and the tank which contains the supply of liquid. The vacuum causes a rush of liquid into the cylinder so that the space beneath the piston is filled completely and any vapor which has formed during the upward stroke is forced out of the cylinder and into the tank.

In addition to the application of displacement measuring in the apparatus, it includes features of special importance such as the provision for increasing the pressure of the packing which must be tight to ensure accurate measurement. It is sometimes necessary to make this adjustment in the field, and owing to the dangerous nature of the liquid it is undesirable that the apparatus should be opened while it contains liquid. In the present apparatus this adjustment can be made without withdrawing the piston from the cylinder and without disturbing the relationship between the piston and the operating lever so that recalibration of the apparatus is not required.

The apparatus also includes a measuring rack to limit the movement of the piston-operating lever so designed as to permit the selection of suitable doses in units and multiples thereof to meet the requirements for trees of different sizes. This is accomplished by providing two paths for the lever with adjustable stops in both paths, one stop being adapted to measure a multiple of the unit adopted while the other is adapted to measure a single unit. By combinations of strokes, therefore, it is possible to obtain accurate doses of any desired size. The rack provides for the selective use of different units, for example, 14 c.c., 18 c.c., etc.

Other features of the apparatus are the arrangement of the operating lever so that the piston rod is not subjected to distortion. The operating lever is supported so that the connection to the piston rod travels always in a straight line. There is no tendency of the piston to tilt, therefore, and wear on the packing and consequent looseness is avoided. The accuracy of measurement is thereby increased materially.

Referring to the drawing, 5 indicates a tank which is adapted to contain the liquid, for example hydrocyanic acid. The tank is supported by a bracket 6 and by a pump cylinder 7 upon a base 8 which is preferably made of laminated wood to afford the required stiffness. A partition 10 extending across the tank restricts the flow of liquid therein to avoid slopping.

The pump cylinder 7 rests upon the base 8 and extends through the tank 5. Its upper end is closed by a cap 11 having a stuffing box 12 through which a piston rod 13 extends. The cylinder is secured permanently by soldering or otherwise to the cap 11 and to a well 14 at the lower side of the tank.

A piston is secured to the lower end of the piston rod 13 and comprises a part 15 which is threadedly mounted on the end of the piston rod and secured by a pin 16 so that its position with respect to the rod is fixed permanently and a part 17 which is also threadedly mounted on the end of the piston rod in movable relation thereto. The parts 15 and 17 of the piston are provided with tapered walls between which a packing 18 is disposed. The packing is adapted to be compressed by movement of the part 17 of the piston toward the fixed part 15 thereof.

A clevis 19 is threadedly secured to the upper end of the piston rod 13 and is held in adjusted position by a locking nut 20. The clevis is connected by a pin 21 to an operating lever 22 pivoted at 23 to a link 24. The link is pivoted at 25 on a bracket 26 formed integrally with the piston head 11 and providing a carrying handle 27. The provision of the link 24 permits the piston rod 13 during operation thereof to travel always in a straight line guided by the stuffing box 12. This avoids the possible bending of the piston rod during operation and the tilting of the piston with consequent wear upon the packing. The operating lever 22 is provided with an operating handle 28 so that the operator can reciprocate the piston within the cylinder.

Adjustment of the pressure of the packing in the cylinder is effected by removing the pin 21 without disturbing the clevis 19. The piston can be then be drawn upwardly in the cylinder. The depending key 29 is provided on the head 11 to cooperate with a corresponding slot 30 on the upper part 17 of the piston. When the key is engaged in the slot the piston rod can be rotated and will carry with it the lower part 15 of the piston. The upper part 17 will move upon the threads either toward or away from the lower part 15 of the piston, depending upon the direction of rotation of the piston rod. By turning the rod so that the part 17 of the piston approaches the part 15 thereof, the packing 18 will be compressed without disturbing the distance between the lower side of the part 15 and the pin 21 which determines the calibration of the instrument. This calibration is fixed before the instrument is sent into the field by adjustment of the clevis 19 on the piston rod 13. Thereafter adjustment of the pressure of the packing does not effect the calibration so long as the locking nut 20 retains the clevis 19 in its original position.

It is desirable to lubricate the piston and consequently a passage 31 is provided in the piston rod 13 extending from end to end thereof. Oil may be introduced at the top of the passage and will flow to a well 32 in the lower part 15 of the piston whence it is distributed through ducts 33 to the packing. The supply of oil contained within the piston rod is sufficient to maintain the packing in proper condition for a considerable time. Fresh oil can be added as required. A suitable grease can be substituted for oil by providing a connection permitting the introduction of the grease under pressure in the manner commonly employed in lubricating automobile bearings.

The cylinder 7 communicates with the interior of the tank 5 through a plurality of openings 34 at the level of the well 14 and through breather openings 35 at the upper end of the cylinder. When the piston is lifted by the actuation of the operating lever 22 until it passes one or more rows of the openings 34, liquid is permitted to flow into the cylinder beneath the piston. The downward stroke of the piston forces the liquid to return to the tank until the piston passes the lowermost row of openings 34. Thereafter upon the continuance of the downward stroke the liquid is ejected from the cylinder through an outlet 36 to a pipe 37. A check valve 38 is held against the outlet 36 by a spring 38' which is supported by a disk 39' having openings 40' therein for the passage of liquid. A nozzle 39 is secured to the end of the pipe 37 and includes a passage 40 leading to an outlet 41 of relatively small dimensions which is adapted to cause the liquid to be broken up into a fine spray. The passage 40 communicates with a passage 42 through on opening 43 which is surrounded by a valve seat. A ball valve 44 rests upon the seat and is held thereon by a spring 45. A removable cap 46 permits access to the valve and spring to permit renewal or adjustment thereof. A removable cap 47 permits access to the passage 42 and facilitates the draining of the apparatus. A shield 47' at the nozzle facilitates withdrawal thereof from the tent.

The springs 45 and 38' are sufficiently strong to overcome the head of liquid in the tank 5, and consequently no liquid can flow through the spray nozzle until the piston has passed the lowermost row of holes 34 which afford communication with the interior of the tank 5. When the piston has passed this row of holes pressure is exerted on the liquid to lift the valve 44 and the liquid is forced therethrough and through the opening 41 in the form of a fine spray which, being dispersed in the atmosphere, quickly evaporates and diffuses. The valves 44 and 38 are closed except during the period when liquid is being forced therethrough under the actuation of the piston. Consequently upon the upward stroke of the piston no air is permitted to enter the pipe 37 or the cylinder 7. The upward stroke of the piston creates a partial vacuum in the cylinder 7 which is broken only when the piston passes the lowermost row of openings 34. Immediately liquid from the tank rushes into the space beneath the piston and displaces any vapors which have formed therein. If any vapors remain beneath the piston they will be forced through the upper rows of openings 34 into the tank at the beginning of the downward stroke of the piston. Likewise any surplus liquid will be returned to the tank until the lower edge of the piston passes the lowermost row of openings 34. At the beginning of each actual working stroke there is, therefore, in the cylinder and the pipe 37 leading therefrom to the spray nozzle a definite volume of liquid. The amount of liquid ejected through the spray nozzle will depend, therefore, upon the volume displaced by the piston during its downward stroke. Any liquid remaining at the end of the downward stroke will be supplemented by additional liquid flowing from the tank to again make up the definite volume of liquid which is present at the beginning of each working stroke.

Measurement of the liquid is effected by limiting the downward stroke of the operating lever 22 and consequently of the piston by the provision of a rack 48 adapted to receive adjustable pins 49 and 50 in the path of the operating lever 22. This rack is constructed to permit measurement of units and multiples thereof, the multiple in the present case being five, although other multiples can be selected. A bumper 48', preferably of rubber, is placed at the upper end of the rack 48 in the path of the lever 22.

In the fumigating field the dosages to be applied to trees are fixed in terms of units, the common units being 14 c.c., 16 c.c., 18 c.c., 20 c.c., 22 c.c., and 24 c.c. The operators use schedules based upon these units and provision must be made, therefore, for the selection of the required unit of measurement. This is accomplished by providing the rack 48 at one side with a plurality of openings 51 in which the pin 50 can be inserted selectively. These openings are marked 14, 16, 18, etc., and indicate that when the lever is depressed until it engages a pin disposed in one of these openings a corresponding volume of liquid will be ejected, that is to say, 14 c.c., 16 c.c., etc.

To avoid the necessity of actuating the lever to measure each unit the rack is divided by a web 52 and the operating lever 22 may be moved on either side of the web. A plurality of openings 53 are provided to receive selectively the pin 49. These openings are marked 14, 16, etc., and indicate that when the operating lever 22 is moved into engagement with the pin 49 in one of these openings a quantity equal in this case to five times the volume of a single unit will be ejected. If, therefore, the operator desires to eject an amount of liquid corresponding to 13 units, each consisting of 14 c.c., he, having first placed the pins in the openings marked "14" on both sides of the rack, will move the lever twice through its full range into contact with the pin 49 and similarly three times into contact with the pin 50. The exact dose is thus ejected. If in the next orchard a unit consisting of 20 c.c. is employed, he will shift the pins 49 and 50 into the corresponding openings on both sides of the rack and he can then eject doses in multiples of this unit as required to effect the proper treatment of trees of different sizes.

Accuracy of measurement as well as selectivity with regard to the unit volume is assured because the only liquid ejected is that which corresponds to the piston displacement. This displacement depends absolutely upon the limitation of the downward movement of the lever. This downward movement is determined exactly by the position of the pins in the rack. As soon as the operating lever comes into contact with the selected pin the piston stops; there is no further pressure exerted upon the liquid in the cylinder 7 and pipe 37 and consequently the valves 44 and 38 close. No liquid can escape through the valves or otherwise from the cylinder until the piston is retracted and again actuated. Upon retraction of the piston the cylinder fills again with liquid so that the downward stroke ejects again a definite proportion of a predetermined volume of liquid in the cylinder and pipe 27.

A certain amount of vapor accumulates in the tank 5 above the liquid therein, particularly when the atmospheric temperature is relatively high. This vapor rises in a space formed in the handle 27 and escapes through a pipe 58 which is connected to a pipe 58'. The latter pipe terminates adjacent to the nozzle 39. Any vapors are, therefore, delivered to a point where they are not harmful to the operator. The volume of vapors so escaping is comparatively slight and does not affect the accuracy of measurement of the apparatus.

To determine the quantity of liquid in the tank a sight-glass 59 is supported between brackets 60 and 61, the former containing a passage 57 through which vapors escape to the interior of the tank through the filling opening 54. The filling opening is normally closed by a cap 55 pivoted at 64 and held by a spring 65 in either open or closed position. A passage 62 in the bracket 61 permits liquid to flow into the sight-glass to the level of the liquid maintained. A pet cock 66 is connected to the passage 62 to facilitate draining of the apparatus. The sight-glass is provided preferably at one side with a colored section which may be blue, for example, while the balance of the glass is clear. This blue streak at the side of the sight-glass indicates clearly the position of the meniscus at the upper end of the column of liquid because that portion of the colored streak which is submerged in the liquid is magnified when viewed therethrough while the portion above the liquid is not magnified. The operator can thus determine the amount of liquid in the tank without examining it closely enough to be affected by any vapors which may exist in the vicinity thereof.

The advantages of the apparatus described are primarily the accuracy and ease with which the operator can deliver doses of a poisonous liquid in the form of a fine spray without danger of injury because of unintentional escape of liquid or vapors from the apparatus. The application of measurement by displacement ensures an accuracy which cannot be attained in apparatus heretofore used which depended upon the use of valves whether positively operated or depending upon the weight of the liquid to ensure the flow thereof into the pump. A special advantage of the apparatus is the possibility of measuring in units of different value without the necessity for the substitution of measuring racks or other modification of the measuring device than the mere shifting of the pins in the rack.

Various changes may be made in the details of construction of the apparatus without departing from the invention or sacrificing any of the advantages thereof.

I claim:

1. In an apparatus for delivering liquids which consists of a cylinder and a piston in the cylinder for ejecting the liquid therefrom, a lever operable to reciprocate the piston and means for limiting the ejecting stroke of the lever, this means comprising a rack divided by a web, holes in the rack on both sides of the web and adjustable pins adapted to fit in these holes, the pins on one side of the rack limiting the movement of the lever to permit the ejection of a measured quantity of liquid and the pins on the other side of the rack limiting the movement of the lever to permit the ejection of a multiple of the first mentioned quantity.

2. In an apparatus for delivering liquids which consists of a cylinder and a piston in the cylinder for ejecting liquid therefrom, a lever operable to reciprocate the piston and means for limiting the ejecting stroke of the lever, this means comprising a rack divided by a web, the lever being capable of movement on either side of the web, and adjustable stroke limiting means on both sides of the web to permit ejection of measured units of varying capacity and multiples thereof.

3. In an apparatus for delivering liquids which consists of a cylinder and a piston in the cylinder for ejecting the liquid therefrom, means for reciprocating the piston and means for limiting the ejecting stroke of the piston, this means comprising a rack divided by a web, adjustable stroke limiting means on both sides of the web to permit the ejection of measured units of varying capacity and multiples thereof.

4. In an apparatus for delivering liquids which consists of a cylinder and a piston in the cylinder for ejecting the liquid therefrom, means for reciprocating the piston and means for limiting the ejecting stroke of the piston, this means consisting of a pair of stroke limiting devices capable of selective use whereby measured units of liquids and multiples thereof may be ejected.

5. In an apparatus for delivering liquids which consists of a cylinder and a piston in the cylinder for ejecting the liquid therefrom, means for reciprocating the piston and means for limiting the ejecting stroke of the piston, this means consisting of a pair of adjustable stroke limiting devices capable of selective use whereby measured units of varying capacities and multiples thereof can be ejected.

In testimony whereof I affix my signature.

JOSEPH D. NEULS.